Sept. 8, 1942.  F. J. VOGEL  2,295,371
ELECTRICAL APPARATUS
Filed May 20, 1941  2 Sheets-Sheet 1

WITNESSES:
B. A. McCloskey.
Wm. C. Groome.

INVENTOR
Fred J. Vogel.
BY Franklin E. Hardy
ATTORNEY

Sept. 8, 1942.  F. J. VOGEL  2,295,371
ELECTRICAL APPARATUS
Filed May 20, 1941  2 Sheets—Sheet 2
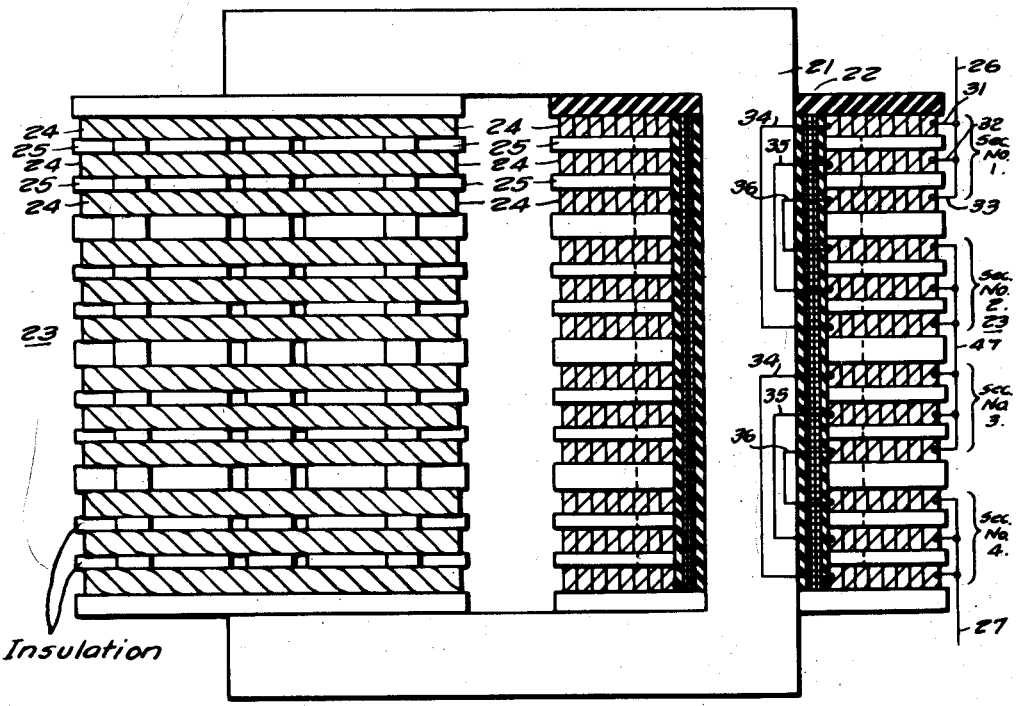
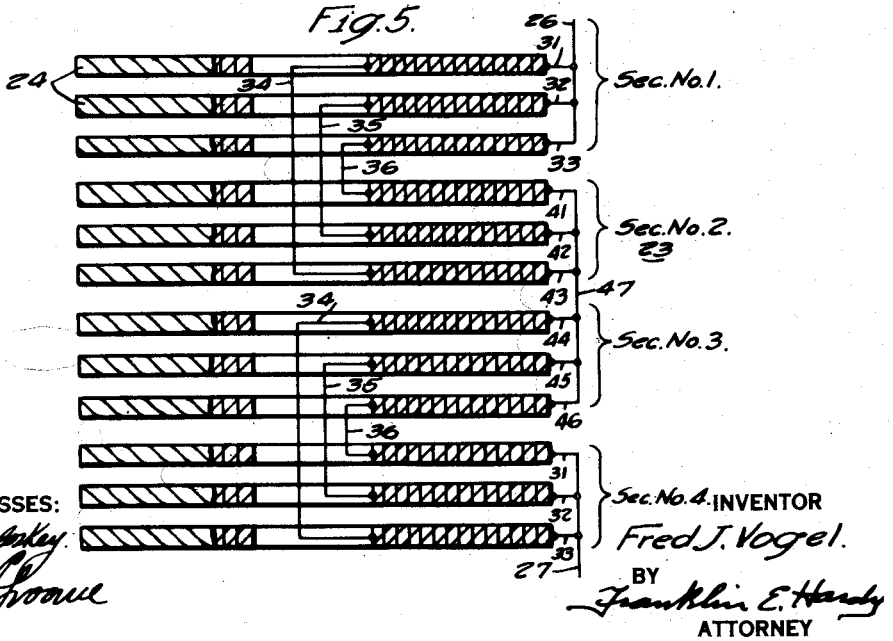

Patented Sept. 8, 1942

2,295,371

UNITED STATES PATENT OFFICE 2,295,371

ELECTRICAL APPARATUS

Fred J. Vogel, Sharon, Pa., assignor to Westinghouse Electric & Manufacturing Company, East Pittsburgh, Pa., a corporation of Pennsylvania Application May 20, 1941, Serial No. 394,269

2 Claims. (Cl. 175—356)

My invention relates to means for improving the electrostatic distribution of surge voltages in the windings of electrical apparatus.

In the windings of electrical apparatus, such as transformers, that are connected to alternating-current transmission lines, the voltage between the terminals of a winding varies uniformly from one end of the winding to the other under normal frequency and voltage conditions of the system. However, during certain conditions of the system, such as may be caused by lightning on the transmission line, a high voltage surge may occur and enter the winding of the transformer.

In windings of the usual construction, a voltage surge will not immediately distribute itself along the winding in a manner to establish a uniform voltage gradient but its initial distribution produces a high concentration of voltage stress on the parts of the winding nearest to the line terminal. When a voltage is suddenly impressed across the terminals of the winding, an instantaneous distribution of the voltage through the winding is effected through the medium of its capacitance. The capacitance of the winding consists of the entire series and parallel capacity elements existing throughout the winding from one terminal to the other, including the capacity from the winding to ground and capacity from one part of the winding to another. The charging of the various capacity elements to the respective potentials corresponding to the initial voltage distribution along the winding is effected by the flow of current between capacity elements which does not flow along the winding conductor or through its inductance, but only through other series elements of capacitance.

If the initial voltage distribution thus produced throughout the winding is not a uniform voltage gradient, subsequent and more gradual changes take place in an effort to establish a uniform voltage distribution. These changes are effected by currents flowing along the winding transferring charges from one capacity element to another through the inductance of the winding. As is well known, such flow of current between capacity elements through inductance results in oscillations, the current surging back and forth with alternating voltage values above and below the values corresponding to a uniform voltage gradient. The amplitude of the oscillations will initially correspond to the difference between the initial voltage distribution and the final voltage distribution along the uniform gradient. These oscillations create successive voltage stresses between adjacent parts of the winding and between the winding and ground. This dangerous initial voltage distribution and the oscillations resulting therefrom will not occur, however, if the initial voltage distribution due to capacitance is uniform with respect to the turns of the winding, that is, if the capacitance associated with the inductance of any winding be disposed in such manner that the potential gradient which would be produced by the capacitance alone is the same as that which would be produced by the inductance alone.

These initial voltage stresses and oscillations will be greatly reduced if the coil to coil capacities are increased so that the potential gradient produced by the capacity alone is more nearly that which would be produced by the inductance alone.

The problem of insulating the conductor turns and coils of a transformer winding to withstand the surge voltages impressed upon them is a difficult one because in the usual construction of these parts, the conductors are so small that satisfactory means of applying sufficient insulation to withstand the voltage stresses is not readily available. If sufficient insulating material be applied about the conductors, the space factor between the conductors will become so large as to effect the efficiency of the design. It is, therefore, desirable to provide for lessening the voltage stresses between the several parts of the winding that are caused by the concentration of surge voltages in order to produce a more effective and efficient structure. This concentration of surge voltages is particularly likely to occur in the case of core type transformers in which the stacks of a relatively large number of individual coils are employed, the separate coils being relatively narrow so that the capacity between coils is small as compared to the capacity between the separate coils and ground. The resulting poor voltage distribution causes high voltage stresses between the coils of the winding, particularly those adjacent the end of the winding, and therefore, requires large distances between the coils in order to provide the necessary insulating strength.

It has been proposed to control the surge voltage distribution along windings by the use of conducting static plates arranged in particular areas to maintain the voltage stresses in those areas at desired potentials to parts of the windings to thereby control the flow of electrostatic energy from the winding.

It is an object of the invention to provide for improving the distribution of surge voltages throughout the winding by an arrangement of the turns of the winding of the electrical apparatus themselves.

Other objects and advantages of the invention will be apparent from the following description of a preferred embodiment of the invention, reference being had to the accompanying drawings, in which:

Fig. 4 is an elevational view partly in section of an arrangement of the winding turns in accordance with the invention; and Fig. 5 is a diagram of the connection of the several coils comprising the high voltage winding arranged in accordance with the invention.

In my copending application for Electrical apparatus, Serial No. 398,067, filed June 14, 1941, an arrangement of the winding turns of the conductor was disclosed in which the successive turns passed through positions of different distribution along the axis of the winding corresponding to different coil levels, so that the winding conductor weaved back and forth between different coil positions of a group of coils displaced along the axis of the winding. This arrangement of the winding structure increases the series capacitance of the winding elements and works well, particularly when a single conductor strand is employed.

In this application, I disclose and claim an arrangement of the winding conductors that is particularly useful when the cross-section of the conductor is such as to make it desirable to form the winding of a plurality of conductor strands.

Figure 1:
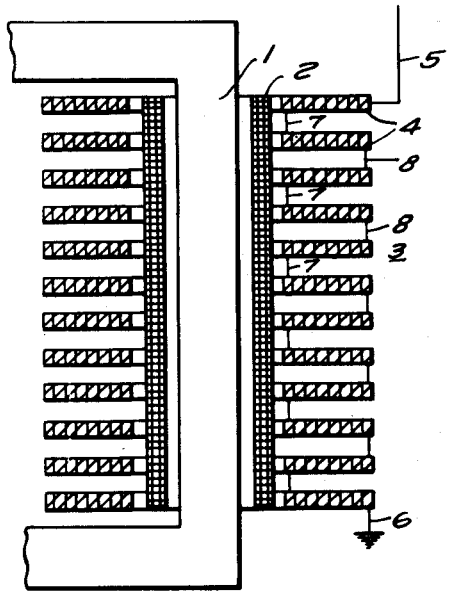
Figure 1 is a sectional view through a portion of a conventional winding structure.

Referring to the drawings, Figure 1 illustrates a portion of a conventional transformer structure having a winding core leg 1 of magnetic material about which is positioned a cylindrical low-voltage winding 2 and a high-voltage winding 3 that is made up of a stack of disc-type coils 4. The winding is shown connected between a high-voltage line terminal 5 at the upper end of the stack of coils and to ground at 6 at the lower end of the stack of coils. The coils are shown connected in "start-start, finish-finish" connection, the conductors 7 connecting the "start" ends of alternate coils together and the conductors 8 connecting the "finish" ends of the alternate coils together to form a series connection through the entire stack.

Figure 2:
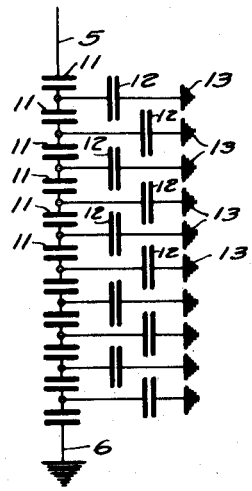
Fig. 2 is a diagram of the capacity network of the high voltage winding of Fig. 1.

The capacity network shown in Fig. 2 corresponds substantially to the arrangement of the capacities between the various parts of the winding and the adjacent parts and between the winding parts and ground. The condenser elements 11 connected in series between the terminals 5 and 6 of the winding correspond substantially to the series capacitances between the coils of the winding, and the condenser elements 12 connected between the distributed points along the series chain of condenser elements and ground 13 correspond to the capacitances between the parts of the winding and the case or core structure which is at ground potential.

Figure 3:
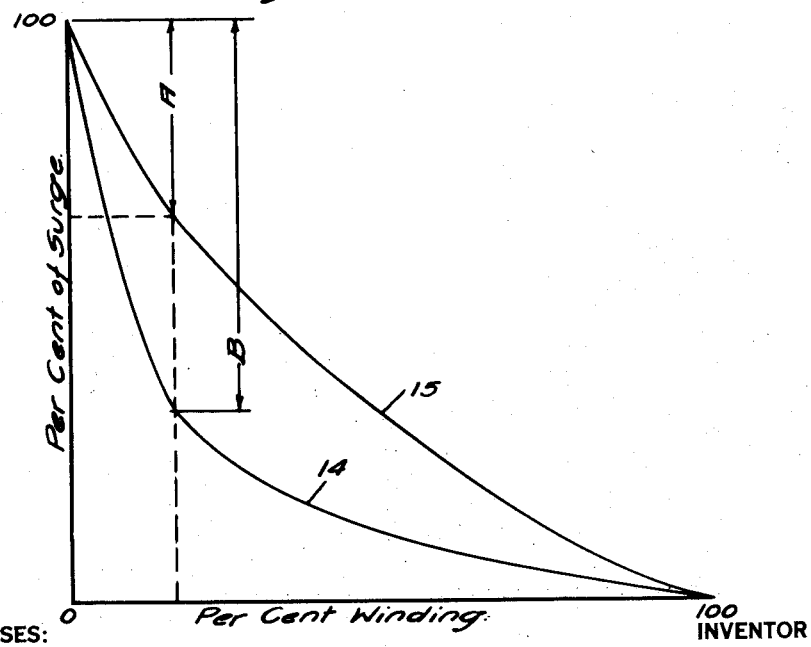
Fig. 3 is a diagram illustrating curves showing the initial surge voltage distribution in a high voltage winding of the character shown in Fig. 1 and a winding constructed in accordance with the invention.

If a voltage surge is suddenly applied to the terminals of the winding in Fig. 1, the initial voltage distribution along the winding will be of the general character shown in the curve 14 of Fig. 3, in which it will be noted that a large part "B" of the initial voltage distribution is across a very small part of the winding. For example, about two-thirds of the initial voltage impressed across the whole stack appears across the first two coils of the stack so that it will be necessary to provide sufficient insulation between these coils and the turns of these coils to withstand this large applied voltage.

In accordance with my invention, one embodiment of which is shown in Figs. 4 and 5, a core 21 is provided having two winding legs about each of which is positioned a low voltage cylindrical type winding 22 and a high voltage flat disc coil type winding 23. The winding 23 is made up of a plurality of flat single-section, single-conductor disc type coils 24 spaced apart by suitable spacer elements 25. The coils are arranged in groups or sections, each winding leg of Fig. 4 being shown as provided with four groups of three coils each, although it will be appreciated that a much larger number of groups of coils than this may be used in an actual transformer structure. The coils comprising the winding are connected in series between terminal conductors 26 and 27, the several coils of one section being connected in parallel circuit relation to each other, as most clearly shown in Fig. 5, in which the terminals 31, 32 and 33 of the three upper coils comprising section No. 1 are all connected to the line terminal 26 of the winding. It will be noted that terminals of the first three coils comprising section No. 1 are connected by conductors 34, 35 and 36, respectively, to the three coils comprising section No. 2 of the winding, the upper coil of section No. 1 being connected by conductor 34 to the lower coil of section No. 2, the middle coil of the two sections being connected together by conductor 35, and the lower coil of section No. 1 being connected to the upper coil of section No. 2 by conductor 36. A similar arrangement of the connections between sections No. 3 and No. 4 is likewise provided and this sequence of connections between successive pairs of winding sections will be continued throughout the winding if a larger number of winding sections are employed. It will also be noted that the "finish" ends of the groups of coils in sections 2 and 3 having coil terminals 41 to 46 are connected to a common conductor 47, thus effecting three parallel paths between the terminal 26 and conductor 47, and a corresponding three parallel paths between conductor 47 and the winding terminal 27. The circuit for the winding 23 on the second winding leg of the core structure may be a duplicate of that illustrated for the winding on the core leg to the right in Fig. 4, both windings having the circuit connections shown in detail in Fig. 5, the two winding stacks being connected either in series or in parallel with each other, in accordance with well known transformer practice.

It is customary, wherever it becomes necessary to employ a plurality of conductor strands to form the winding of an electrical apparatus, to group these parallel strands together as the component parts of a single conductor and to wind this multiple strand conductor as a single conductor in the conventional manner shown in Fig. 1, each turn of this conductor comprising each of the several strands in the same manner as would be the case if a single strand only were used, except that the several strands may be transposed within the conductor group. By separating the several strands comprising the winding conductor and forming a plurality of single-section, single-conductor coils connected in parallel and spaced apart from each other along the axis of the winding, the separate coils comprising winding turns of different strands of the conductor, the series capacitance of the winding is materially increased without changing the value of the capacitance from the winding parts to ground, so that a more even initial distribution of surge voltage occurs on the winding. It will be noted, for example, that the first effective turn of the winding as a whole comprises the outer turn of each of the three coils of section No. 1 connected to the winding terminal 26, the several parallel first turn strands being connected to the coil terminals 31, 32 and 33, respectively, and distributed along the length of the whole of section No. 1. By properly spacing the three coils comprising the section, it is possible to reduce materially the potential gradient in the winding due to capacitance alone and hence reduce the oscillations and coil to coil insulation required.

It will be noted, by reference to Fig. 3 of the drawings that the voltage "A" across the indicated portion of the winding constructed in accordance with the invention is about one half the voltage "B" across a corresponding portion of the conventional winding of Fig. 1. The actual shape of the curve 15 may change with different spacing of the parts depending upon the desired degree of approach of the initial voltage distribution to a straight line gradient.

It will be apparent to one skilled in the art that modifications in the arrangement of parts may be made within the spirit of my invention, and I do not wish to be limited otherwise than by the scope of the appended claims.

I claim as my invention:

1. Electrical inductive apparatus including a winding comprising a plurality of parallel connected strands, the path of each strand including a plurality of similar disc-type coils spaced along a common axis, said coils being grouped, each group including a plurality of parallel connected strands at the same distance from the points of common connection of the strands, the position of the series connected coils in adjacent pairs of such groups being transposed in inverse order in the stack of coils, the spacing of the coils of the winding being proportioned to provide a relatively large series capacitance between the winding parts to provide a substantially uniform potential gradient along the winding upon a sudden increase of potential across its terminals.

2. Electrical inductive apparatus including a winding comprising a plurality of parallel connected strands, the path of each strand including a plurality of similar disc-type coils spaced apart along a common axis, said coils being grouped, each group including a plurality of parallel connected strands having the same distance range from the points of common connection of the strands, said strands being connected together at points forming the terminals of each pair of such groups, the positions of the series connected coils in adjacent pairs of such groups being transposed in inverse order in one group of the pair with respect to the other, the spacing of the coils of the winding being proportioned to provide a relatively large series capacitance between the winding parts to provide a substantially uniform potential gradient along the winding upon a sudden increase of potential across its terminals.

FRED J. VOGEL.